(12) United States Patent
Schauder et al.

(10) Patent No.: US 7,790,795 B2
(45) Date of Patent: Sep. 7, 2010

(54) SCRATCH AND MAR RESISTANT POLYMER COMPOSITIONS, METHODS FOR MAKING AND ARTICLES MADE FROM THE SAME

(75) Inventors: Jean-Roch Schauder, Wavre (BE); Jeffrey Valentage, Royal Oak, MI (US); Prasadarao Meka, Seabrook, TX (US); Alan Joseph Oshinski, Friendswood, TX (US); Jared Michael Hill, Brighton, MI (US); Vincent B. B. G. Gallez, Ottignies (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 936 days.

(21) Appl. No.: 11/441,412

(22) Filed: May 25, 2006

(65) Prior Publication Data

US 2007/0276063 A1 Nov. 29, 2007

(51) Int. Cl.
*C08K 11/00* (2006.01)
(52) U.S. Cl. ........................ 524/442; 524/528
(58) Field of Classification Search ................ 524/442, 524/528
See application file for complete search history.

(56) References Cited

U.S. PATENT DOCUMENTS

| | | | |
|---|---|---|---|
| 4,417,019 A | 11/1983 | Yamamoto et al. | 524/456 |
| 5,591,795 A | 1/1997 | Nomura et al. | 524/451 |
| 5,747,592 A | 5/1998 | Huff et al. | 525/191 |
| 5,783,620 A * | 7/1998 | Hamashima et al. | 524/405 |
| 5,973,070 A | 10/1999 | Baann | 525/70 |
| 6,939,903 B2 | 9/2005 | Sigworth et al. | 523/200 |
| 2003/0040426 A1 | 2/2003 | Barrera et al. | |
| 2004/0186332 A1 | 9/2004 | Kong et al. | |
| 2005/0058822 A1 | 3/2005 | Ittel | 428/304.4 |
| 2005/0154101 A1 | 7/2005 | Mcenhill et al. | 524/210 |
| 2006/0009554 A1 | 1/2006 | Sharma | 524/230 |

FOREIGN PATENT DOCUMENTS

| | | |
|---|---|---|
| DE | 103 02 355 | 7/2003 |
| DE | 10 2005 038 865 | 2/2006 |
| DE | 10 2005 033 865 | 1/2007 |
| WO | 01/42344 | 6/2001 |
| WO | WO 02/51933 | 7/2002 |
| WO | WO 03/106512 | 12/2003 |
| WO | 2004/099303 | 11/2004 |
| WO | 2005/011145 | 2/2005 |
| WO | WO 2005/014169 | 2/2005 |
| WO | 2005/066265 | 7/2005 |
| WO | 2005/111145 | 11/2005 |
| WO | 2006/026058 | 3/2006 |
| WO | WO 2006/074254 | 7/2006 |

OTHER PUBLICATIONS

Vanderbilt Report, Rubber and Plastics Department, R. T. Vanderbilt Company, Inc., No. 702, entitled "Wollastonite in Polypropylene Size, Shape and Surface Modification", Norwalk, Connecticut, 6 pages.

* cited by examiner

*Primary Examiner*—Peter D Mulcahy
(74) *Attorney, Agent, or Firm*—Kevin M. Faulkner

(57) ABSTRACT

Provided is a polymer composition comprising a thermoplastic, an ethylene alpha-olefin plastomer, a fibrous inosilicate and a slip agent. The polymer composition exhibits superior scratch and mar resistance as indicated by a Ford Five Finger scratch resistance on Ford Fawn 2ZK grain of at least 15 N. Also provided are shaped articles made from the polymer compositions. Also provided are methods for making scratch and mar resistant polymer compositions. Finally, articles made from the polymer compositions are also provided, particularly automotive exterior, interior and fascia parts, requiring scratch and mar resistance.

22 Claims, No Drawings

SCRATCH AND MAR RESISTANT POLYMER COMPOSITIONS, METHODS FOR MAKING AND ARTICLES MADE FROM THE SAME

FIELD OF THE INVENTION

The present invention relates to polymer compositions with improved scratch and mar resistance, methods for making the same and useful articles formed therefrom. In particular, the invention relates to a polymer composition comprising a thermoplastic, an ethylene alpha-olefin plastomer, a fibrous inosilicate and a slip agent. In another aspect, the polymer composition further comprises a modified polyolefin.

BACKGROUND OF THE INVENTION

It is known in the art to prepare polymer compositions comprising a thermoplastic polymer matrix within which reinforcing fillers are dispersed. Often these fillers are of organic origin, such as cellulosic or lignocellulosic fibers. Other reinforcing fillers include fiberglass, carbon fibers, graphite fibers, metal fibers, whiskers, aramides, talc, mica, calcium carbonate, glass microspheres, ceramic microspheres, glass wool, rock wool, stainless steel wool, steel wool and gypsum. Certain ceramic fibers are also used as reinforcing fillers, such as alumna, alumna silica and silica. Incorporation of these fillers can impart improved properties, such as stiffness and scratch/mar resistance, to the thermoplastic matrix. For instance, talc is a common polypropylene filler used to increase flexural rigidity and thermal resistance. See U.S. Pat. No. 5,591,795.

Industrial and automotive applications frequently use filled polymer systems to provide desirable mechanical properties, such as stiffness or scratch/mar resistance. However, use of polymer fillers sometimes adversely affect the polymer's surface smoothness and cause deleterious effects on the appearance of scratches or mars in the polymer systems. An example is the white color of a surface scratch often exhibited by a talc-filled polymer system. Many attempts have been made to limit the deleterious effects of the fillers with limited success. See U.S. Patent Publication No. 2005/0,154,101. Therefore, a need exists for polymer compositions exhibiting superior scratch and mar resistance while maintaining the good mechanical properties of the thermoplastic matrix material.

Fillers are known to often be incompatible with the thermoplastic matrix in which one attempts to disperse them. Fillers, in particular fibrous fillers, such as silica fibers, are often surface treated with a silane, usually an organosilane, compound in order to make them more compatible with the thermoplastic matrix. While not wishing to be bound by theory, it is believed that when the silicate is contacted with an organosilane, the silane end bonds to the surface of the silicate. The organic end of the silane compound acts as a wetting agent, making it easier for the thermoplastic to contact and coat the silica surface. Additionally, functionalized (or modified) polyolefins, such as maleated polypropylene or maleated ethylene alpha-olefin copolymers, are used to further compatiblize the filler with the thermoplastic matrix. Suitable functionalized polyolefins are described in U.S. Patent Application Publication No. US 2006/0,009,554, incorporated by reference as if fully disclosed herein. When used, the modified polyolefins form a bridge of sorts between the silane treated silica and the thermoplastic matrix. The silane group binds the silica to the anhydride groups of maleated polypropylene via amide linkages, and the polypropylene backbone becomes entangled with the thermoplastic matrix.

Silane-treatment of fillers is, however, costly, and use of the modified polyolefins further adds to the cost of preparation of the polymer system (and consequently any articles made therefrom). The present invention solves this and other problems by use of untreated fibrous inosilicates as fillers in the inventive polymer compositions.

It is also known in the art to prepare polymer compositions comprising a thermoplastic polymer matrix and a plastomer additive. The plastomer often imparts impact resistance and flexibility to the thermoplastic polymer matrix, thereby rendering it more useful in common applications such as automobile parts. See U.S. Pat. No. 5,747,592, incorporated by reference as if fully disclosed herein.

The present invention provides scratch and mar resistant polymer compositions by combining, in one aspect, a thermoplastic, an ethylene alpha-olefin plastomer, an untreated fibrous inosilicate and a slip agent. In another aspect, a modified olefin polymer is also added to the composition to make the inosilicate more compatible with the thermoplastic matrix. In other aspects, the present invention provides methods for improving the scratch and mar resistance of a thermoplastic material, useful articles formed from the inventive polymer compositions and methods of making the useful articles.

SUMMARY OF THE INVENTION

One aspect of the present invention provides a polymer composition comprising at least one thermoplastic, an ethylene alpha-olefin plastomer, an untreated fibrous inosilicate, a slip agent and, optionally, a modified olefin polymer. In another aspect, the polymer composition comprises from 20 to 30 wt % plastomer, 5 to 30 wt % inosilicate, 2 to 4 wt % slip agent and the remainder thermoplastic. If present, the modified olefin polymer is preferably present in the amount of from 0.1 to 5 wt %. In yet another aspect, the polymer compositions of the present invention exhibit a Ford Five Finger scratch resistance on Ford Fawn 2ZK grain of at least 15 N and/or a notched IZOD impact strength at $-20°$ C. of at least 5 $kJ/m^2$.

The polymer composition may be further processed to form useful or shaped articles, including, but not limited to, automotive parts such as interior and exterior trim, bumper fascia and door or instrument panels. In one aspect, the useful or shaped articles may be formed by thermoforming, blow molding, injection molding, compression molding or injection-compression molding.

The invention also provides a method for improving the scratch and mar resistance of a thermoplastic by adding to it an effective amount of an ethylene alpha-olefin plastomer and an untreated fibrous inosilicate and from 0.01 to 5 wt % of a slip agent. The thermoplastic blend is melt mixed to achieve a distribution of the other components within the thermoplastic matrix.

The invention also provides a method for making a shaped article comprising blending a thermoplastic, an ethylene alpha-olefin plastomer, an untreated fibrous inosilicate and a slip agent to form the inventive polymer composition, extruding the composition to form an extrudate and shaping the extrudate to form a shaped article.

DETAILED DESCRIPTION

As used herein, the new numbering scheme for the Periodic Table of Elements Groups are used as in Hawley's Condensed Chemical Dictionary 852 (John Wiley & Sons, 13th ed. 1997).

As used herein, the term "polymer" refers to the product of a polymerization reaction, and is inclusive of homopolymers, copolymers, terpolymers, etc.

As used herein, unless specified otherwise, the term "copolymer(s)" refers to polymers formed by the polymerization of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene.

As used herein, when a polymer is referred to as "comprising a monomer," the monomer is present in the polymer in the polymerized form of the monomer or in the derivative form the monomer.

As used herein, the phrase "ethylene alpha-olefin copolymer" refers to such heterogeneous materials as linear low density polyethylene (LLDPE), and very low and ultra low density polyethylene (VLDPE and ULDPE); and homogeneous polymers such as metallocene catalyzed polymers such as EXACTS materials supplied by Exxon, and TAFMER® materials supplied by Mitsui Petrochemical Corporation. These materials generally include copolymers of ethylene with one or more comonomers selected from $C_3$ to $C_{10}$, alpha-olefins such as propene, butene-1, hexene-1, octene-1, etc. in which the molecules of the copolymers comprise long chains with relatively few side chain branches or cross-linked structures. Other ethylene alpha-olefin copolymers, available from the Dow Chemical Company, known as ENGAGE®, AFFINITY® and ATTANE® resins, are also included as another type of ethylene alpha-olefin copolymer useful in the present invention.

As used herein, "propylene impact copolymer" ("ICP") is an in situ reactor blend of two phases or components, a matrix component and a copolymer rubber component dispersed in the matrix. Propylene impact copolymers are also sometimes referred to in the art as propylene heterophasic copolymers or propylene-ethylene block copolymers. As is known in the art, impact copolymers are usually produced in a sequential series polymerization process wherein the matrix component, often a homopolymer, is produced in one or more initial reactors and then transferred to one or more subsequent reactors where the copolymer rubber is produced and incorporated within the matrix component. The copolymer component has rubbery characteristics and provides the desired impact resistance, whereas the matrix component provides overall stiffness. Examples of propylene impact copolymers and processes for producing them are disclosed in U.S. Pat. Nos. 5,258,464, 5,362,782 and 6,207,756 and International Patent Publication No. WO 01/64980.

As used herein, a "plastomer" shall mean ethylene based copolymers having a density in the range of about 0.86 to 0.915 g/cm$^3$. Often, it will be desirable to use the lowest density plastomer consistent with maintaining good handling of the plastomer resin. In warm climates, it will often be desirable to use densities above 0.890 g/cm$^3$ to avoid the need for chilled resin storage (due to cold flow of lower density resins with the desired melt index). Plastomers, as used in the current invention, typically exhibit a MFR of from about 0.5 to about 30 dg/min. The plastomers used in this invention comprise copolymers of ethylene and at least one $C_3$ to $C_{10}$ alpha-olefin, preferably octene. Illustrative non-limiting examples of suitable copolymers are those such as ethylene butene-1, ethylene hexene-1, ethylene octene-1, and ethylene propylene copolymers.

As used herein, "molecular weight" means weight average molecular weight ("Mw"). Mw is determined using Gel Permeation Chromatography. Molecular Weight Distribution ("MWD") means Mw divided by number average molecular weight ("Mn"). (For more information, see U.S. Pat. No. 4,540,753 to Cozewith et al. and references cited therein, and in Verstrate et al., 21 Macromolecules 3360 (1998)). The "Mz" value is the high average molecular weight value, calculated as discussed by A. R. Cooper in Concise Encyclopedia of Polymer Science and Engineering 638-39 (J. I. Kroschwitz, ed. John Wiley & Sons 1990).

As used herein, "thermoplastic" includes only those thermoplastic materials that have not been functionalized or substantially altered from their original chemical composition. For example, as used herein, polypropylene, propylene ethylene copolymers, propylene alpha-olefin copolymers, polyethylene and polystyrene are thermoplastics. However, maleated polyolefins are not within the meaning of thermoplastic as used herein.

As used here, "modified olefin polymer" means a functionalized olefin polymer that has been treated with an acid or anhydride, such as a carboxylic acid or maleic anhydride, so as to form a grafted polymer, i.e. one in which a functional group is grafted to the polymeric backbone.

As used herein, "inosilicate(s)" is any of a class of materials characterized as chain silicates, with interlocking chains of silicate tetrahedra with either $SiO_3$ structure (1:3 silicon to oxygen ratio) for single chain inosilicates (such as wollastonite) or $Si_4O_{11}$ (4:11 silicon to oxygen ratio) for double chain inosilicates. Particular examples include, but are not limited to calcium silicate ("wollastonite"), sodium calcium silicate hydroxide ("pectolite") or hydrated calcium silicate ("okenite").

As used herein, weight percent ("wt %"), unless noted otherwise, means a percent by weight of a particular component based on the total weight of the mixture containing the component. For example, if a mixture contains three pounds of sand and one pound of sugar, then the sand comprises 75 wt % (3 lbs. sand/4 lbs. total mixture) of the mixture and the sugar 25 wt %.

For purposes of the invention, Melt Flow Rates (MFR) are determined in accordance with ASTM D 1238 at 230° C. and 2.16 Kg weight.

For purposes of the inventions, notched IZOD impact strengths are determined in accordance with ISO 180/4A.

As used herein, Ford Five Finger scratch resistances are determined in according with Ford Laboratory Test Method BN 108-13 ("Ford test"). Similar to ASTM D 5178, the Ford test is a constant load scratch method utilizing single-probe loading. However, in order to test a range of loads simultaneously, five separate probes are utilized, each applying a different constant load to the polymer. Typically, loads of 0.6 N, 2 N, 3 N, 6 N, and 7 N are applied for polymeric coatings while applied loads up to 30 N are used for thermoplastic polymers. The molded plaques used for evaluation have grained surfaces (as per Ford Fawn 2ZK or General Motors GMN 2943) to simulate automobile applications. The probes are 1 mm diameter polished steel spheres and the scratch speed is 100 nm/s. The scratch length is generally not reported but is likely to be on the order of at least 10 mm. Scratch resistance is defined by a visual inspection of the scratch area. A material with a Ford Five Finger scratch resistance of 15 N does not exhibit any stress whitening in the scratch area made under a 15 N load as described above.

Polymer Compositions

One aspect of the present invention is directed to polymer blends and compositions comprising at least one thermoplastic, an ethylene alpha-olefin plastomer, a fibrous inosilicate and a slip agent.

In an embodiment, the thermoplastics of the invention may be polypropylene, propylene ethylene copolymer, propylene alpha-olefin copolymer, polyethylene, polystyrene and mixtures thereof. In an embodiment, when the thermoplastic is propylene ethylene copolymer, the copolymer preferably comprises of from 1 to 10 wt % ethylene derived units. In one embodiment, the thermoplastic is present in the amount of from 40 to 60 wt % of the blend, preferably 45 to 55 wt %, more preferably from 48 to 52 wt %.

Preferably, the thermoplastics of the present invention are propylene impact copolymers comprising of from 1 to 20 wt % ethylene derived units. The propylene impact copolymers may comprise from 65 to 95 wt % propylene homopolymers and from 5 to 35 wt % ethylene-propylene rubber. The ethylene-propylene rubber phase may comprise from 35 to 55 wt % ethylene derived units, and may exhibit an intrinsic viscosity of from 1.0 to 15.0. In an embodiment, the propylene impact copolymers may exhibit a MFR of at least 20 dg/min or at least 30 dg/min or at least 50 dg/min or at least 70 dg/min. Preferably, at least two propylene impact copolymers are present and exhibit MFRs in excess of 20 dg/min for the first impact copolymer and in excess of 70 dg/min for the second impact copolymer.

In an embodiment, the ethylene alpha-olefin plastomer ("plastomer") comprises $C_3$ to $C_{10}$ alpha-olefin derived units, preferably octene derived units. In another embodiment, the plastomer comprises of from 10 to 40 wt % alpha-olefin derived units, preferably from 15 to 35 wt %, more preferably from 20 to 30 wt %. In an embodiment, the plastomer comprises of from 20 to 30 wt % of the blend, preferably from 22 to 28 wt %, more preferably from 23 to 27 wt % and more preferably from 24 to 26 wt %.

In an embodiment, the fibrous inosilicate may be wollastonite, pectolite or okenite, preferably wollastonite. In one aspect, the fibrous inosilicate is present in the amount of from 5 to 30 wt %, preferably from 10 to 25 wt %, and more preferably from 15 to 25 wt %. In another aspect, the inosilicates of the present invention exhibit an aspect ratio of at least 3.5:1, preferably at least 4.0:1, more preferably at least 4.5:1. As used herein, an "aspect ratio" means a ratio of a fiber's length to the fiber's diameter, so, for example, a fiber 5 mm long and 2.5 mm in diameter would have an aspect ratio of 2:1. In another embodiment, the fibrous inosilicate is untreated.

In an embodiment, the slip agents of the present invention include, but are not limited to, are fatty amides and high molecular weight polysiloxanes. The fatty amides are usually produced from fatty acids containing between 16 and 22 carbon atoms. These fatty amide slip agents are characterized by a variety of structural forms, including, but not limited to, monounsaturated primary amides (erucamide and oleamide), saturated primary amides (stearamide and behenamide), secondary amides (stearyl erucamide and oleyl palmitamide), bis amides (ethylene bis-stearamide) and mixtures thereof. In an embodiment, the slip agent is present in the amount of from 0.01 to 2.5 wt %, preferably of from 0.05 to 1 wt % or more preferably of from 0.05 to 0.5 wt %.

In another embodiment, the polymer blends further comprise a modified olefin polymer. The modified olefin polymer may contain $C_3$ to $C_{30}$ alpha-olefin derived units, and is functionalized with a long chain alcohol or amine to form ester, amide or imide species. Examples include, but are not limited to, maleated polypropylene, maleated propylene copolymers, maleated polyethylene, maleated polyethylene copolymers and mixtures thereof. Other examples of modified olefin polymers that may be used in the present invention include the graft-modified polymers described in U.S. Pat. Nos. 6,884,850 and 7,015,283, both incorporated by reference as if fully included herein. In an aspect of the invention, the modified olefin polymer is present in the amount of from 0.1 to 5 wt %, preferably from 0.5 to 4.5 wt %, preferably from 1 to 4 wt % and even more preferably from 2 to 4 wt %.

In an embodiment, the polymer blends of the invention exhibit a MFR of from 5 to 30 dg/min, preferably 10 to 25 dg/min, more preferably from 12 to 23 dg/min and even more preferably from 14 to 20 dg/min.

In another aspect of the invention, the polymer blends exhibit a notched IZOD impact strength at −20° C. of at least 5 kJ/m$^2$, more preferably at least 5.5 kJ/m$^2$, more preferably at least 6.0 kJ/m$^2$, even more preferably at least 7.0 kJ/m$^2$, more preferably at least 8.0 kJ/m$^2$, more preferably at least 9 kJ/m$^2$, more preferably at least 10 kJ/m$^2$, and even more preferably at least 12 kJ/m$^2$. In other aspects, the polymer blends exhibit notched Charpy impact strength at −20° C. of at least 5 kJ/m$^2$, more preferably at least 5.5 kJ/m$^2$, more preferably at least 6.0 kj/m$^2$, even more preferably at least 7.0 kJ/m$^2$, more preferably at least 8.0 kJ/m$^2$, more preferably at least 9 kJ/m$^2$ and more preferably at least 10 kJ/m$^2$.

In an embodiment, the polymer blends exhibit a Ford Five Finger scratch resistance on Ford Fawn 2ZK grain or on General Motors GMN 3943 grain of at least 15 N, preferably greater than 18 N, more preferably at least 20 N.

Shaped Parts and Articles

In an embodiment, the present invention envisions shaped parts and articles formed from polymer compositions comprising at least one thermoplastic, an ethylene alpha-olefin plastomer, an untreated fibrous inosilicate and a slip agent.

In other embodiments, the shaped parts and articles further comprise a modified olefin polymer. In yet other embodiments, the shaped articles do not contain any treated silica materials.

In certain embodiments of the present invention, the shaped parts and articles may be automotive exterior trim pieces, automotive interior trim pieces, instrument panels, bumper fascia or door panels.

In certain embodiments, the shaped parts and articles are formed by thermoforming, blow molding, injection molding, compression molding or injection-compression molding.

In another embodiment, the shaped articles exhibit IZOD impact strength at −20° C. of at least 5 kJ/m$^2$, preferably at least 5.5 kJ/m$^2$, more preferably at least 6.0 kJ/m$^2$ and even more preferably at least 7.0 kJ/m$^2$.

In yet another embodiment the shaped articles exhibit a Ford Five on Ford Fawn 2ZK or General Motors GMN 3943 grain scratch resistance of at least 15 N, preferably greater than 18 N, more preferably at least 20 N.

Methods

In an embodiment, the present invention provides a method for improving the scratch and mar resistance of a thermoplastic. The method includes the steps of (1) adding to a thermoplastic (a) an effective amount of an ethylene alpha-olefin plastomer, (b) an effective amount of a fibrous inosilicate and (c) from 0.01 to 0.5 wt % of a slip agent and (2) melt mixing the blend to achieve a distribution of the additives within the thermoplastic. The thermoplastic, plastomer, fibrous inosilicate and slip agent may be as described above and are preferably present in the same amounts as described above. In an embodiment, an "effective amount" of plastomer is from 10 to 40 wt %, preferably from 20 to 30 wt %. In an embodiment, an "effective amount" of fibrous inosilicate is from 5 to 30 wt %, preferably from 20 to 25 wt %. In an alternative embodiment of the method, the fibrous inosilicate is untreated. In another embodiment, an effective amount of plastomer and effective amount of fibrous inosilicate is an amount of each that results in the thermoplastic blend having a notched IZOD impact strength at −20° C. of at least 5 kJ/m$^2$ and a Ford Five Finger scratch resistance on Ford Fawn 2ZK or General Motors GMN 3943 grain of at least 15 N.

The melt mixing step may be accomplished through any means or device known to those of skill in the art for melt mixing materials with thermoplastics. The devices may include, but are not limited to a, Banbury mixer, Buss co-kneader, Farrel continuous mixer, planetary extruder, single screw extruder, co-rotating multi-screw screw extruder, counter rotating multi-screw screw extruder, co-rotating intermeshing extruder or ring extruder.

In another embodiment, the present invention provides a method for making a shaped article. The method includes the steps of (1) blending a thermoplastic, an ethylene alpha-olefin plastomer, a fibrous inosilicate and a slip agent, (2) extruding the resulting blend to form an extrudate and (3) shaping the extrudate to form a shaped article. The thermoplastic, plastomer, fibrous inosilicate and slip agent may be as described above and are preferably present in the same amounts as described above. In an alternative embodiment of the method, the fibrous inosilicate is untreated.

In certain embodiments, the shaped article of the method herein described is formed by thermoforming, blow molding, injection molding, compression molding or injection-compression molding. In yet other embodiments, the shaped articles of the method herein described may be automotive exterior trim pieces, automotive interior trim pieces, instrument panels, bumper fascia or door panels.

In yet other embodiments, the present invention includes:

A. A polymer blend comprising at least one thermoplastic, an ethylene alpha-olefin plastomer, a fibrous inosilicate, and a slip agent.

B. A polymer blend comprising
  at least one thermoplastic present in the amount of from 40 to 55 wt % based on the total weight of the blend;
  an ethylene alpha-olefin plastomer present in the amount of from 25 to 30 wt % based on the total weight of the blend;
  an untreated fibrous inosilicate present in the amount of from 20 to 25 wt % based on the total weight of the blend; and
  a slip agent present in the amount of from 0.01 to 0.5 wt % based on the total weight of the blend;
  where the sum of the weight percentages of thermoplastic, ethylene alpha-olefin plastomer, inosilicate and slip agent does not exceed 100%.

C. The polymer blend of any of the preceding embodiments, wherein the at least one thermoplastic is selected from polypropylene, propylene ethylene copolymer, propylene alpha-olefin copolymer, polyethylene, polystyrene and mixtures thereof.

D. The polymer blend of any of the preceding embodiments, wherein the at least one thermoplastic is a propylene ethylene copolymer comprising of from 1 to 10 wt % ethylene derived units based on the total weight of the thermoplastic.

E. The polymer blend of any of the preceding embodiments, wherein the at least one thermoplastic comprises a first propylene ethylene copolymer and a second propylene ethylene copolymer.

F. The polymer blend of embodiment E, wherein the first propylene ethylene copolymer comprises of from 1 to 7 wt % ethylene derived units and the second propylene ethylene copolymer comprises of from 5 to 20 wt % ethylene derived units.

G. The polymer blend of any of embodiments E through F, wherein the first propylene ethylene copolymer exhibits a MFR of at least 70 dg/min and the second propylene ethylene copolymer exhibits a MFR of at least 20 dg/min.

H. The polymer blend of any of embodiments E through G, wherein the first propylene ethylene copolymer exhibits an intrinsic viscosity of from 4.0 to 12.0 and the second propylene ethylene copolymer exhibits an intrinsic viscosity of from 1.0 to 4.0.

I. The polymer blend of any of embodiments A or C through H, wherein the at least one thermoplastic is present in the amount of from 40 to 60 wt % based on the total weight of the blend.

J. The polymer blend of any of embodiments A or C through I, wherein the at least one thermoplastic is present in the amount of from 45 to 55 wt % based on the total weight of the blend.

K. The polymer blend of any of the preceding embodiments, wherein the ethylene alpha-olefin plastomer comprises C3 to C10 alpha-olefin derived units.

L. The polymer blend of any of the preceding embodiments, wherein the ethylene alpha-olefin plastomer comprises of from 10 to 40 wt % alpha-olefin derived units.

M. The polymer blend of any of embodiments A or C through L, wherein the ethylene alpha-olefin plastomer is present in the amount of from 20 to 30 wt % based on the total weight of the blend.

N. The polymer blend of any of embodiments A or C through M, wherein the ethylene alpha-olefin plastomer is present in the amount of from 23 to 27 wt % based on the total weight of the blend.

O. The polymer blend of any of the preceding embodiments, wherein the fibrous inosilicate is selected from wollastonite, pectolite, okenite and mixtures thereof.

P. The polymer blend of any of the preceding embodiments, wherein the fibrous inosilicate consists essentially of wollastonite.

Q. The polymer blend of any of the preceding embodiments, wherein the fibrous inosilicate exhibits an aspect ratio of at least 3.5:1.

R. The polymer blend of any of the preceding embodiments, wherein the fibrous inosilicate is untreated.

S. The polymer blend of any of embodiments, A or C through R, wherein the fibrous inosilicate is present in the amount of from 5 to 30 wt % based on the total weight of the blend.

T. The polymer blend of any of embodiments, A or C through S, where the fibrous inosilicate is present in the amount of from 10 to 25 wt % based on the total weight of the blend.

U. The polymer blend of any of the preceding embodiments, further comprising a modified olefin polymer.

V. The polymer blend of embodiment U, wherein the modified olefin polymer is selected from maleated polypropylene, maleated propylene copolymers, maleated polyethylene, maleated ethylene copolymers and mixtures thereof.

W. The polymer blend of any of embodiments U or V, wherein the modified olefin polymer is present in the amount of from 0.1 to 5 wt % based on the total weight of the blend.

X. The polymer blend of any of embodiments U through W, wherein the modified olefin polymer is present in the amount of from 2 to 4 wt % based on the total weight of the blend.

Y. The polymer blend of any of the preceding embodiments, wherein the slip agent is selected from primary amides, secondary amides, bisamides and mixtures thereof.

Z. The polymer blend of any of embodiments, A or C through Y, wherein the slip agent is present in the amount of from 0.01 to 2.5 wt % based on the total weight of the blend.

AA. The polymer blend of any of embodiments, A or C through Z, wherein the slip agent is present in the amount of from 0.05 to 1.0 wt % based on the total weight of the blend.

BB. The polymer blend of any of embodiments, A or C through AA, wherein the slip agent is present in the amount of from 0.05 to 0.5 wt % based on the total weight of the blend.

CC. The polymer blend of any of the preceding embodiments, wherein the polymer blend exhibits a MFR of from 10 to 25 dg/min.

DD. The polymer blend of any of the preceding embodiments, wherein the polymer blend exhibits a notched IZOD impact strength at −20° C. of at least 5 kJ/m$^2$.

EE. A shaped part comprising the polymer blend of any of the preceding embodiments, where the part has a Ford Five Finger scratch resistance on Ford Fawn 2ZK grain of at least 15 N.

FF. A shaped article comprising at least one thermoplastic, an ethylene alpha-olefin plastomer, an untreated fibrous inosilicate and a slip agent, and absent any treated silicate, wherein the shaped article exhibits
a notched IZOD impact strength at −20° C. of at least 5 kJ/m$^2$; and
a Ford Five Finger scratch resistance on Ford Fawn 2ZK grain of at least 15 N.

GG. The shaped article of embodiment FF, wherein the at least one thermoplastic comprises a first propylene ethylene copolymer and a second propylene ethylene copolymer.

HH. The shaped article of embodiment GG, wherein the first propylene ethylene copolymer comprises of from 1 to 7 wt % ethylene derived units and the second propylene ethylene copolymer comprises of from 5 to 20 wt % ethylene derived units.

II. The shaped article of any of embodiments GG through HH, wherein the first propylene ethylene copolymer exhibits a MFR of at least 70 dg/min and the second propylene ethylene copolymer exhibits a MFR of at least 20 dg/min.

JJ. The shaped article of any of embodiments GG through II, wherein the first propylene ethylene copolymer exhibits an intrinsic viscosity of from 4.0 to 12.0 and the second propylene ethylene copolymer exhibits an intrinsic viscosity of from 1.0 to 4.0.

KK. The shaped article of any of embodiments FF through JJ, further comprising a modified olefin polymer.

LL. The shaped article of any of embodiments FF through KK, where the part has a Ford Five Finger scratch resistance on Ford Fawn 2ZK grain of at least 15 N.

MM. The shaped article of any of embodiments FF through LL, wherein the article is shaped by thermoforming, blow molding, injection molding, compression molding or injection-compression molding.

NN. The shaped article of any of embodiments FF through MM, wherein the shaped part is selected from automobile exterior trim pieces, interior trim pieces, instrument panels, bumper fascia and door panels.

OO. A method to improve the scratch and mar resistance of a thermoplastic comprising:
adding an effective amount of an ethylene alpha-olefin plastomer to the polypropylene to form a blend;
adding an effective amount of an untreated fibrous inosilicate to the blend;
adding from 0.01 to 0.5 wt % based on the total weight of the blend of a slip agent to the blend; and
melt mixing the blend to achieve a distribution of the ethylene alpha-olefin plastomer copolymer, untreated fibrous inosilicate and slip agent within the thermoplastic.

PP. A method of making a shaped article comprising:
blending a thermoplastic, an ethylene alpha-olefin plastomer, an untreated fibrous inosilicate and a slip agent to form a polymer blend wherein,
the ethylene alpha-olefin plastomer is present in the amount of from 25 to 30 wt % based on the total weight of the blend;
the untreated fibrous inosilicate present in the amount of from 20 to 25 wt % based on the total weight of the blend; and
the slip agent is present in the amount of from 0.01 to 0.5 wt % based on the total weight of the blend;
extruding the polymer blend to form an extrudate; and
shaping the extrudate to form a shaped article.

QQ. The method of any of embodiments OO through PP, wherein the thermoplastic is selected from polypropylene, propylene ethylene copolymer, propylene alpha-olefin copolymer, polyethylene, polystyrene and mixtures thereof.

RR. The method of any of embodiments OO through PP, wherein the thermoplastic comprises a first propylene ethylene copolymer and a second propylene ethylene copolymer.

SS. The method of embodiment RR, wherein the first propylene ethylene copolymer comprises of from 1 to 7 wt % ethylene derived units and the second propylene ethylene copolymer comprises of from 5 to 20 wt % ethylene derived units.

TT. The method of any of embodiments RR through SS, wherein the first propylene ethylene copolymer exhibits a MFR of at least 70 dg/min and the second propylene ethylene copolymer exhibits a MFR of at least 20 dg/min.

UU. The method of any of embodiments RR or QQ through TT, wherein the ethylene alpha-olefin plastomer is present in the amount of from 25 to 30 wt % based on the total weight of the blend.

VV. The method of any of embodiments RR or QQ through UU, wherein the untreated fibrous inosilicate present in the amount of from 20 to 25 wt % based on the total weight of the blend.

WW. The method of any of embodiments OO through VV, further comprising:
adding from 2 to 4 wt % based on the total weight of the blend of a modified olefin polymer to the blend.

XX. The method of embodiment WW, wherein the modified olefin polymer is selected from maleated polypropylene, maleated propylene copolymers, maleated ethylene copolymers and mixtures thereof.

YY. The method of embodiment OO, wherein the melt mixing occurs in a Banbury mixer, Buss co-kneader, Farrel continuous mixer, planetary extruder, single screw extruder, co-rotating multi-screw screw extruder, counter rotating multi-screw screw extruder, co-rotating intermeshing extruder or ring extruder.

ZZ. The method of any of embodiments OO through YY, wherein the shaped article is selected from automobile exterior trim pieces, interior trim pieces, instrument panels, bumper fascia and door panels.

AAA. The method of embodiment PP, wherein the shaping step is accomplished by thermoforming, blow molding, injection molding, compression molding or compression injection molding.

BBB. The method of any of embodiments OO through AAA, wherein the shaped article is selected from automobile exterior trim pieces, interior trim pieces, instrument panels, bumper fascia and door panels.

The above description is intended to be illustrative of the invention, but should not be considered limiting. Persons skilled in the art will recognize that various modifications may be made without departing from the spirit and scope of the invention. Accordingly, the invention will be deemed to include all such modifications that fall within the appended claims and their equivalents.

EXAMPLES

The polymer compositions of the examples 1-14 comprise a blend of two propylene impact copolymers ("ICP 1" and "ICP 2") (PP7805E2 and AX03BE3, both available from ExxonMobil Chemical Company), a plastomer (Exact® 5361 available from ExxonMobil Chemical Company for examples 1-14 and Tafmer® A4050S available from Mitsui Chemicals America, Inc. for examples 15-16), an untreated fibrous inosilcate (Nyglos® 4W for examples 1-14 and Nyglos® 2 for examples 15-16, both available from NYCO Minerals, Inc.), a slip agent (erucamide) and, optionally, one of six different modified olefin polymers (maleated polypropylenes or high propylene elastomers). Additionally, example 15 included a nucleation agent (HPN-68L available from Milliken Chemical).

The polymer compositions of examples 1-14 were melt mixed on a Leistritz Model 89 Type LSM 30.34, co-rotating twin-screw extruder with screw diameters of 34 mm. Screw speed was fixed for all examples at 200 rpm. The feed rate to the extruder was also fixed at 10 kg/hour. The extruder was equipped with ten temperature zones, and melt mixing temperatures in zones 1 through 8 were held between 195° C. and 205° C., while zone 9 was maintained between 219° C. and 221° C. and zone 10 between 229° C. and 231° C. Residence time in the extruder was approximately 90 to 120 seconds. The extruder was fitted with a die having 3 holes of 3 mm diameter each. Following melt mixing, the polymer composition was pelletized.

Examples 1-8

|  | Example Number | | | | | | | |
| --- | --- | --- | --- | --- | --- | --- | --- | --- |
|  | 1 | 2 | 3 | 4 | 5 | 6 | 7 | 8 |
| ICP 1 (wt %) | 25 | 25 | 25 | 20 | 20 | 20 | 20 | 20 |
| ICP 2 (wt %) | 36 | 36 | 36 | 30 | 30 | 30 | 30 | 33 |
| Plastomer (wt %) | 26 | 26 | 26 | 27 | 27 | 27 | 27 | 27 |
| Untreated Inosilicate (wt %) | 10 | 10 | 10 | 20 | 20 | 20 | 20 | 20 |
| Slip Agent (wt %) | 0.2 | 0.2 | 0.2 | 0.2 | 0.2 | 0.2 | — | 0.2 |
| PO1020 (wt %) | — | 3 | — | 3 | — | — | — | — |
| REXT 1932B (wt %) | — | — | 3 | — | 3 | — | — | — |
| REXT 2033 (wt %) | 3 | — | — | — | — | 3 | 3 | — |
| REXT 2045-5 (wt %) | — | — | — | — | — | — | — | — |
| MDEX 104-5-2 (wt %) | — | — | — | — | — | — | — | — |
| MDEX 104-5-2 (wt %) | — | — | — | — | — | — | — | — |
| Flexural Modulus (MPa) ISO 178 | 845 | 1125 | 1069 | 1560 | 1428 | 1052 | 1130 | 1491 |
| Elastic Modulus (MPa) ISO 527 | 931 | 1329 | 1210 | 1787 | 1698 | 1211 | 1271 | 1606 |
| Tensile Strength @Yield (MPa) ISO 527 | 16.3 | 18.1 | 17.3 | 19.5 | 19.3 | 17.6 | 17.6 | 15.6 |
| Elongation at Break (%) ISO 527 | 100 | 74 | 75 | 50 | 43 | 76 | 46 | 17 |
| Notched IZOD/Condition (kJ/m2) ISO 180/4A | | | | | | | | |
| 23° C. | 36/2P | 27/2P | 29/2P | 24/1P | 25/0P | 27/1P | 29/0P | 42/1P |
| 0° C. | 24/1P | 19/1P | 20/1P | 18/1P | 20/0P | 21/1P | 22/1P | 32/3P |
| −20° C. | 7/1C | 6/1C | 7/0C | 7/0C | 8/0C | 8/0C | 8/0C | 24/2P |
| Notched Charpy/Condition (kJ/m2) ISO 179/2 | | | | | | | | |
| 23° C. | 37/2P | 26/1P | 28/0P | 23/0P | 24/0P | 26/1P | 27/0P | 51/1P |
| 0° C. | 25/1P | 18/1P | 21/1P | 18/0P | 20/0P | 21/0P | 21/0P | 38/4P |
| −20° C. | 7/0C | 6/0C | 7/0C | 6/0C | 7/0C | 7/0C | 7/0C | 30/3P |

-continued

|  | Example Number | | | | | | | |
|---|---|---|---|---|---|---|---|---|
|  | 1 | 2 | 3 | 4 | 5 | 6 | 7 | 8 |
| MFR (dg/min) 230° C./2.16 Kg | 24.2 | 27.0 | 24.8 | 23.5 | 19.8 | 19.3 | 18.7 | 18.6 |
| Ford Five Finger Scratch Resistance Ford Fawn 2ZK Grain (N) | 15 | 15 | 15 | 20 | 20 | 20 | 5 | 15 |

Examples 9-16

|  | Example Number | | | | | | | |
|---|---|---|---|---|---|---|---|---|
|  | 9 | 10 | 11 | 12 | 13 | 14 | 15 | 16 |
| ICP 1 (wt %) | 17 | 17 | 17 | 17 | 17 | 17 | 23.4 | 22.5 |
| ICP 2 (wt %) | 28 | 28 | 28 | 28 | 28 | 28 | 41.0 | 39.0 |
| Plastomer (wt %) | 27 | 27 | 27 | 27 | 27 | 27 | 15.0 | 15.0 |
| Untreated Inosilicate (wt %) | 25 | 25 | 25 | 25 | 25 | 25 | 20 | 20 |
| Slip Agent (wt %) | 0.2 | 0.2 | 0.2 | 0.2 | 0.2 | 0.2 | 0.5 | 0.5 |
| Milliken HPN-68L Nucleation Agent (wt %) | — | — | — | — | — | — | 0.05-0.1 | — |
| PO1020 | — | 3 | — | — | — | — | — | 3 |
| REXT 1932B | 3 | — | — | — | — | — | — | — |
| REXT 2033 | — | — | 3 | — | — | — | — | — |
| REXT 2045-5 | — | — | — | 3 | — | — | — | — |
| MDEX 104-5-2 | — | — | — | — | 3 | — | — | — |
| MDEX 104-5-2 | — | — | — | — | — | 3 | — | — |
| Flexural Modulus (MPa) ISO 178 | 1649 | 1736 | 1218 | 1233 | 1165 | 1209 | 1962 | 1728 |
| Elastic Modulus (MPa) ISO 527 | 1891 | 2040 | 1384 | 1409 | 1370 | 1347 | 2089 | 1964 |
| Tensile Strength @Yield (MPa) ISO 527 | 19.6 | 19.8 | 18.2 | 18.4 | 18.5 | 18.3 | 18.3 | 19.5 |
| Elongation at Break (%) ISO 527 | 21 | 42 | 50 | 28 | 67 | 66 | 58.4 | 63.6 |
| Notched IZOD/Condition (kJ/m2) ISO 180/4A | | | | | | | | |
| 23° C. | 25/0P | 25/0P | 28/0P | 28/0P | 29/1P | 29/1P | — | — |
| 0° C. | 20/0P | 19/0P | 22/1P | 22/0P | 23/0P | 23/0P | — | — |
| −20° C. | 10/0H | 10/0H | 11/0H | 10/0H | 13/1H | 11/0H | — | — |
| Notched Charpy/Condition (kJ/m2) ISO 179/2 | | | | | | | | |
| 23° C. | 25/0P | 24/0P | 28/1P | 28/0P | 28/0P | 28/0P | 41.9/10P | 12.0/10P |
| 0° C. | 21/0P | 19/0P | 22/0P | 22/0P | 24/0P | 24/0P | 8.3/10C | 4.6/10C |
| −20° C. | 9/1C | 8/0C | 9/1C | 8/0C | 10/0C | 11/1C | — | — |
| MFR (dg/min) ASTM D1238 | 16.7 | 18.8 | 16.4 | 16.6 | 14.5 | 14.6 | 39.7 | 23.3 |
| Ford Five Finger Scratch Resistance Ford Fawn 2ZK Grain (N) | 20 | 20 | 20 | 20 | 20 | 20 | — | — |
| Ford Five Finger Scratch Resistance General Motors GMN 3943 Grain (N) | — | — | — | — | — | — | 15 | 15 |

What is claimed is:

1. A polymer blend comprising about 40 to 60 wt % of at least one thermoplastic based on total weight of the blend, an ethylene alpha-olefin plastomer, a fibrous inosilicate, and a slip agent,
   wherein the at least one thermoplastic is selected from polypropylene, propylene ethylene copolymer, propylene alpha-olefin copolymer, polyethylene, polystyrene and mixtures thereof.

2. The polymer blend of claim 1, wherein the at least one thermoplastic is present in the amount of from 45 to 55 wt % based on the total weight of the blend.

3. The polymer blend of claim 1, wherein the ethylene alpha-olefin plastomer is present in the amount of from 23 to 27 wt % based on the total weight of the blend.

4. The polymer blend of claim 1, wherein the fibrous inosilicate is selected from wollastonite, pectolite, okenite and mixtures thereof.

5. The polymer blend of claim 1, wherein the fibrous inosilicate exhibits an aspect ratio of at least 3.5:1.

6. The polymer blend of claim 1, wherein the fibrous inosilicate is present in the amount of from 5 to 30 wt % based on the total weight of the blend.

7. The polymer blend of claim 1, wherein the polymer blend exhibits a MFR of from 10 to 25 dg/min.

8. The polymer blend of claim 1, wherein the polymer blend exhibits a notched IZOD impact strength at $-20°$ C. of at least 5 $kJ/m^2$.

9. A shaped part comprising the blend of claim 1, where the part has a Ford Five Finger scratch resistance on Ford Fawn 2ZK grain of at least 15 N.

10. A polymer blend comprising
    at least one thermoplastic present in the amount of from 45 to 55 wt % based on the total weight of the blend, wherein the at least one thermoplastic is selected from polypropylene, propylene ethylene copolymer, propylene alpha-olefin copolymer, polyethylene, polystyrene and mixtures thereof;
    an ethylene alpha-olefin plastomer present in the amount of from 25 to 30 wt % based on the total weight of the blend;
    an untreated fibrous inosilicate present in the amount of from 20 to 25 wt % based on the total weight of the blend; and
    a slip agent present in the amount of from 0.01 to 0.5 wt % based on the total weight of the blend;
    where the sum of the weight percentages of thermoplastic, ethylene alpha-olefin plastomer, inosilicate and slip agent does not exceed 100%.

11. The polymer blend of claim 10, wherein the ethylene alpha-olefin plastomer comprises $C_3$ to $C_{10}$ alpha-olefin derived units.

12. The polymer blend of claim 10 wherein the untreated fibrous inosilicate is selected from wollastonite, pectolite, okenite and mixtures thereof.

13. The polymer blend of claim 10, wherein the untreated fibrous inosilicate exhibits an aspect ratio of at least 3.5:1.

14. The polymer blend of claim 10, wherein the polymer blend exhibits a notched IZOD impact strength at $-20°$ C. of at least 5 $kJ/m^2$.

15. A shaped article comprising at least one thermoplastic that includes a propylene impact copolymer, an ethylene alpha-olefin plastomer, an untreated fibrous inosilicate and a slip agent, and absent any treated silicate, wherein the shaped article exhibits
    a notched IZOD impact strength at $-20°$ C. of at least 5 $kJ/m^2$; and
    a Ford Five Finger scratch resistance on Ford Fawn 2ZK grain of at least 15 N.

16. A method of making a shaped article comprising:
    blending a thermoplastic, an ethylene alpha-olefin plastomer, an untreated fibrous inosilicate and a slip agent to form a polymer blend wherein,
    the thermoplastic is present in the amount of from 45 to 55 wt % based on the total weight of the blend and the thermoplastic is selected from polypropylene, propylene ethylene copolymer, propylene alpha-olefin copolymer, polyethylene, polystyrene and mixtures thereof;
    the ethylene alpha-olefin plastomer is present in the amount of from 25 to 30 wt % based on the total weight of the blend;
    the untreated fibrous inosilicate present in the amount of from 20 to 25 wt % based on the total weight of the blend; and
    the slip agent is present in the amount of from 0.01 to 0.5 wt % based on the total weight of the blend;
    extruding the polymer blend to form an extrudate; and
    shaping the extrudate to form a shaped article.

17. The method of claim 16, wherein the shaping step is accomplished by thermoforming, blow molding, injection molding, compression molding or compression injection molding.

18. The method of claim 16, further comprising the following step before extruding:
    adding a modified olefin polymer to the blend, wherein the modified olefin polymer is present in the amount of from 2 to 4 wt % based on the total weight of the blend.

19. The shaped article of claim 15, wherein the propylene impact copolymer comprises from 1 to 20 wt % ethylene derived units, based upon weight of the propylene impact copolymer.

20. The shaped article of claim 15, wherein the thermoplastic comprises a second propylene impact copolymer.

21. The shaped article of claim 20, wherein the propylene impact copolymer exhibits a MFR in excess of 20 dg/min and the second propylene impact copolymer exhibits a MFR in excess of 70 dg/min.

22. The shaped article of claim 20, wherein the propylene impact copolymer copolymer exhibits an intrinsic viscosity of from 4.0 to 12.0 and the second propylene impact copolymer exhibits an intrinsic viscosity of from 1.0 to 4.0.

* * * * *